United States Patent [19]

Hodges et al.

[11] Patent Number: 4,585,317

[45] Date of Patent: Apr. 29, 1986

[54] REFLECTOR WITH ATTENUATING CONNECTING PLATES

[75] Inventors: Marvin P. Hodges, 6162 Leeland St. S., St. Petersburg, Fla. 33715; Gilbert P. Hodges, St. Petersburg, Fla.

[73] Assignee: Marvin Hodges, Simi Valley, Calif.

[21] Appl. No.: 438,489

[22] Filed: Nov. 2, 1982

Related U.S. Application Data

[63] Continuation-in-part of Ser. No. 318,462, Nov. 5, 1981, abandoned.

[51] Int. Cl.$^4$ .................. G02B 5/10; H01Q 19/12
[52] U.S. Cl. .................. 350/628; 343/840; 350/612
[58] Field of Search .............. 350/292, 293, 299, 303; 126/417, 424, 438, 450; 343/840, 832–834; 362/341

[56] References Cited

U.S. PATENT DOCUMENTS

| | | | |
|---|---|---|---|
| 503,004 | 3/1893 | Severy | 350/294 |
| 1,248,456 | 12/1917 | Clark | 126/451 X |
| 2,471,828 | 5/1949 | Mautner | 343/18 |
| 3,167,776 | 1/1965 | Suliteanu | 343/872 |
| 3,234,550 | 2/1966 | Thomas | 343/912 |
| 3,235,872 | 2/1966 | Schepis | 343/912 |
| 3,490,405 | 1/1970 | Reader et al. | 350/293 X |
| 3,832,717 | 8/1974 | Taggart, Jr. | 343/840 |
| 3,971,023 | 7/1976 | Taggart | 343/840 |
| 3,977,773 | 8/1976 | Hubbard | 350/292 |
| 4,066,887 | 1/1978 | Levis | 362/341 |
| 4,076,689 | 2/1978 | Mills | 524/131 |
| 4,085,999 | 4/1978 | Chahroudi | 350/1.1 |
| 4,124,277 | 11/1978 | Stang | 350/310 |
| 4,148,298 | 4/1979 | Sherman | |
| 4,188,358 | 2/1980 | Withoos et al. | 343/912 |
| 4,200,359 | 4/1980 | Lawson | 350/303 |
| 4,201,991 | 5/1980 | Vines | 343/840 |
| 4,223,983 | 9/1980 | Bloom | 350/293 X |
| 4,281,900 | 8/1981 | Lewis | 343/840 X |
| 4,284,065 | 8/1981 | Brill-Edwards | 126/450 X |
| 4,337,997 | 7/1982 | Sasoune et al. | 350/296 X |

FOREIGN PATENT DOCUMENTS

| | | |
|---|---|---|
| 7036315 | 10/1970 | Fed. Rep. of Germany . |
| 1466176 | 9/1971 | Fed. Rep. of Germany . |
| 2615607 | 10/1977 | Fed. Rep. of Germany . |
| 2821375 | 11/1978 | Fed. Rep. of Germany . |
| 2308701 | 7/1981 | Fed. Rep. of Germany . |

OTHER PUBLICATIONS

US–Navy Technical Disclosure Bulletin, vol. 5, No. 6, Jun. 1980, pp. 5–8.

Primary Examiner—John K. Corbin
Assistant Examiner—David Lewis
Attorney, Agent, or Firm—Kenyon & Kenyon

[57] ABSTRACT

A reflector and method for making the same involves joining a set of curved reflective segments together to form a concave reflector having a focal point common to all of the segments. Each segment is conveniently a quarter section of the overall reflector, for example, and includes a pair of connecting plates arranged generally perpendicularly with respect to one another along its peripheral edges. The plates of adjacent segments may be joined together such that each segment and its associated plates are directed generally towards the common focal point. The various segments may be made by conventional plastic forming techniques and coated on one side thereof with reflective material.

54 Claims, 7 Drawing Figures

REFLECTOR WITH ATTENUATING CONNECTING PLATES

CROSS REFERENCE TO RELATED APPLICATIONS

This is a continuation-in-part of copending application Ser. No. 318,462, filed Nov. 5, 1981 now abandoned.

BACKGROUND OF THE INVENTION

1. Field of the Invention

This invention relates generally to reflectors and methods for making them, and particularly to dish-type electromagnetic energy antennas.

2. Background Art

The proliferation of reflectors, and particularly dish-type reflectors, in fields such as solar energy, satellite communications, microwave receivers and transmitters and the like has generated an increased demand for low cost reflectors. Prior reflectors suitable for these applications, generally of a size greater than three feet in diameter, are massive systems that are cast, spun or fiberglassed and require substantial pedestal complexes for anchoring, aiming and pointing the reflector. These systems are generally expensive because they do not lend themselves to mass production techniques and are subject to extremely high shipping costs.

While conventional plastic forming techniques are gaining increasing acceptance, such techniques, including thermoforming techiques, have not gained acceptance in the field of electromagnetic energy reflectors because of the high degree of precision and strength required for these surfaces. The conventional techniques for making thermoformed plastic radio-frequency reflective surfaces have relied upon embedded metals in the plastic rather than metal films. Embedded metals in sufficient concentrations to reflect RF energy, however, weaken plastics. Additionally, because these embedded metals are mixed throughout the plastic sheet, reflection is a function of the sheet thickness and not the surface of the formed part. The surface deviation (RMS) of embedded metals can be no better than the thickness of the plastic sheet or substrate, plus any other shape deformity. If the plastic substrates are made sufficiently thin, problems develop during the metallization process due to the tendency of the substrates to deflect during metallization. Additionally, such substrates are not amenable to large scale outdoor applications because of their tendency to deflect under their own weight and to distort in response to wind loading. Discrete thin metal films, on the other hand, vary only with variations of the molded surfaces and thus lower RMS figures can be achieved.

SUMMARY OF THE INVENTION

It is an object of the present invention to provide an electromagnetic energy reflector that overcomes many of the disadvantages of prior art reflectors.

It is an object of the present invention to provide an electromagnetic energy reflector which can be produced at much lower cost using mass production techniques without sacrificing the required precision and strength of the resulting structure.

It is another object of the present invention to provide such a reflector which can be produced to the required tolerances using conventional thermoforming techniques.

It is still another object of the present invention to provide a reflective surface which can be produced by plastic forming techniques and transported with ease and low cost.

It is yet another object of the present invention to provide a method for producing a precision reflective coating on a flexible substrate possessing good durability.

It is also an object of the present invention to provide an antenna having improved ability to reject off-axis energy without sacrificing gain.

It is still another object of the present invention to provide a segmented antenna reflector with significant side lobe suppression, better target discrimination and directionality, enhanced noise rejection and a net increase in gain.

These and many other objects and advantages of the present invention are achieved by a segmented reflector for electromagnetic energy including at least two curved reflective segments joined together so that the segments have a common focal point. At least one connecting plate is arranged between and connected to each of the segments with the plate directed towards the focal point of the reflective segments.

In accordance with another aspect of the present invention, a segmented reflector includes at least two curved flexible segments. At least one connecting plate is arranged between and connected to each of the segments. A surface including a layer of reflective or electrically conductive material, such as, for example metal or metallized foil is laminated to one side of each segment. The segments are connected to have a common focal point with an edge of the connecting plate directed toward the common focal point and extending over the reflective surface a distance generally toward the focal point of less than about 70% of the focal length of the reflector.

In accordance with another aspect of the present invention, a method of making a reflector includes the step of forming at least two plastic segments, each including a curved surface. A reflective layer, e.g. metal foil, is applied to the curved surface of each segment. The segments are arranged to have a common focal point. The connecting plate is arranged to extend over the foil layer and is directed at the common focal point.

In accordance with another aspect of the present invention, an energy reflector includes a curved energy reflective surface defining a focal point and a focal line. A pair of generally perpendicular flat plates extend outwardly of the surface, intersecting one another generally on the focal line of the reflective surface. Each plate has a pair of opposed reflective side surfaces and a pair of opposed edges, one of the edges adjacent the reflective surface and the other of the edges directed generally towards the focal point.

DETAILED DESCRIPTION OF THE PREFERRED EMBODIMENT

Figure 1:
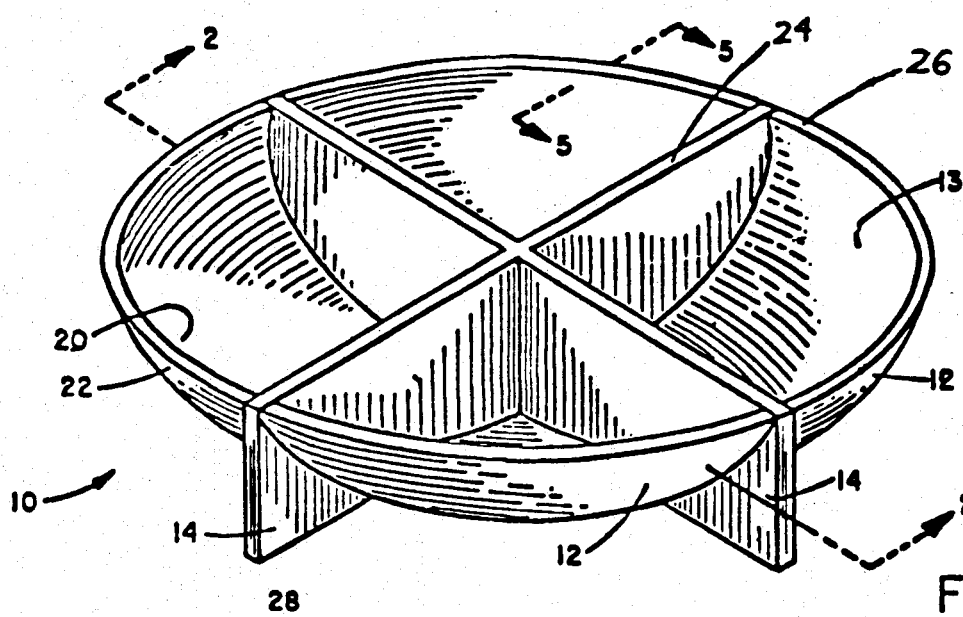
FIG. 1 is a perspective view of one embodiment of the present invention.

Referring to the drawings wherein like reference characters are used for like parts throughout the several views, there is shown in FIG. 1 a segmented reflector 10 including a set of four joined segments 12 forming a concave or dish reflective surface 13. In the illustrated embodiment, the various segments 12 are identical, each forming an equal portion of the overall reflective surface 13; however, non-symmetrical structures utlizing variously shaped segments 12 may be utilized. The segments may, for example, be quarter sections as shown. Each segment 12 abuts a pair of radially arranged, perpendicular flat plates 14. While the reflective surface in the illustrated embodiment is parabolic, a variety of reflective surfaces 13 can be implemented using the present invention. The reflective surface 13 made up of the segments 12 has a single common focus or focal point generally indicated as 18 in FIG. 2.

Figure 2:
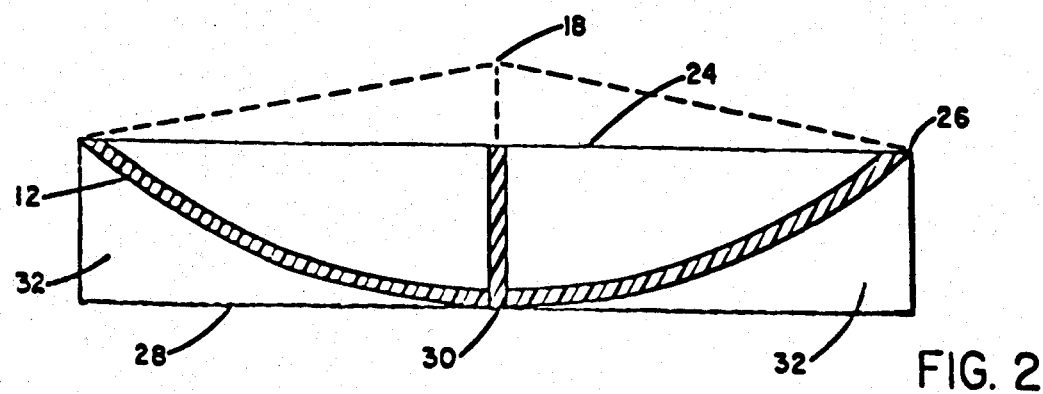
FIG. 2 is a cross-sectional view taken generally along the line 2—2 in FIG. 1.

The pairs of perpendicular plates 14 attached to the edges of each segment 12, as shown in FIG. 2, are directed toward the focal point 18. In the illustrated ebmodiment, each plate 14 is generally rectangular so that it extends above the reflective surface 13 on the concave side 20 of the reflector 10 and beyond the convex side 22 of the segment 12 as well. In the illustrated embodiment, the outer edge 24 of each plate 14 is conveniently flush with the peripheral edge 26 of the reflector 10. Similarly, the inner plate edges 28, positioned on the convex side 22 of the reflector 10 are contained in a plane which also includes the vertex 30 of the reflector 10, as best shown in FIG. 2. The vertex 30 and focal point 18 define a focal line which preferably coincides with the line of intersection of the plates 14. The thickness of the plates 14, measured from one segment 12 to the next adjacent segment 12, is relatively thin, the imposition of the plates 14 over the reflective surface 13 not significantly affecting the reflection of energy from the reflective surface 13. This is true as long as the plates 14 do not extend outwardly from the reflective surface 13 more than 70% of the focal distance and as long as the portion of the plates 14 extending over the reflective surface 13 is directed generally toward the focal point of the surface 13. Thus, the flat plates 14 lend considerable strength and rigidity to the overall structure without significantly affecting the reflecting effectiveness of the reflector 10.

Figure 3:
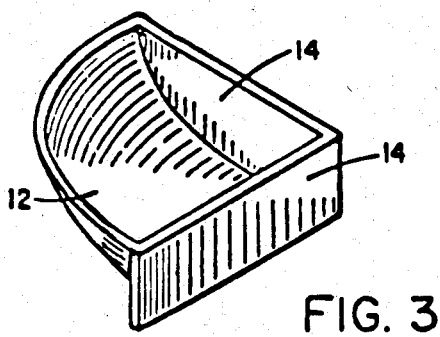
FIG. 3 is a perspective view of one of the segments making up another embodiment of the present invention.

Preferably, the segments 12, conveniently made of a plastic material, such as, for example, styrene, are formed by conventional plastic forming techniques and most preferably by thermoforming techniques, particularly vacuum forming. If desired, the plates 14 may be formed integrally with the segments 12, as shown in FIG. 3, and the plates 14 of adjacent segments 12 connected conventionally such as mechanically or by adhesive or the like to form the reflector 10. Alternatively, the plates 14 may be formed separately of the segments 12, the plates 14 conveniently forming a single integral piece, as indicated in FIG. 1, which are attached to the segments 12 subsequently by threaded fasteners, adhesive techniques, or the like. The segments 12 are advantageously formed of flexible sheet material to facilitate the deposition of a reflective surface on the flexible substrate, as described later.

The plates 14 also provide a means for mounting and supporting the reflector 10. Particularly, the portions 32 which extend outwardly of the convex side 22 of reflector 10 can be secured to conventional mounting apparatus (not shown) to enable adjustment and aiming of the reflector 10. Since in the embodiment illustrated, the plates 14 define a pair of perpendicular walls, the plates 14 may be used to provide accurate elevational and azimuthal alignment information. Particularly, a simple plumb bob (not shown) may be located on a vertically arranged surface of a plate 14 on the convex side 22 to indicate elevation and a compass (not shown) may be arranged on a flat plate 14 arranged perpendicularly to the plate 14 including the plumb bob, to indicate azimuth.

By making the plates 14 of electrically insulating material such as plastic, an electrical barrier is provided between the segments 12. Each segment then develops its own phase center which adds together "in phase" with the signal fed from the other segments 12 without affecting the composite signal amplitude. This appears to improve side lobe suppression, target discrimination, noise rejection and gain. Moreover, the portions of the plates 14 extending over the reflective surface 13 may be covered on both sides with a reflective surface that reflects and thus attenuates off-axis energy received by the reflector 10, thereby improving the ability of the reflector to reject off-axis energy. By maintaining the dielectric separation between the reflective surfaces of the plates 14, the plates 14 may not only improve off-axis energy attentuation but may at the same time maintain the electrical isolation of the segments 12, thus achieving the performance improvements discussed previously.

It has also been found, that besides providing improved mechanical properties as well as the electrical barrier referred to above, the plates 14 also provide an antenna having improved off-axis noise rejection, directionality and side lobe suppression by shielding the detector located at the focus from off-axis energy. This result occurs whether or not the segments 2 are electrically insulated from each other, and whether or not the plates 14 are made from electrically conductive or insulating material. The use of the electrical barrier provided by insulated segments in combination with the reflective properties of the plates 14 has been observed to provide the best antenna performance; however, plates similar to the plates 14 whether insulated or not, may be utilized in conjunction with conventional dish antennas to provide reflective surfaces between various portions of the antenna in order to improve directionality and off-axis noise rejection. Consequently, plates such as the plates 14 may be used to improve the performance of existing antennas.

Figure 6:
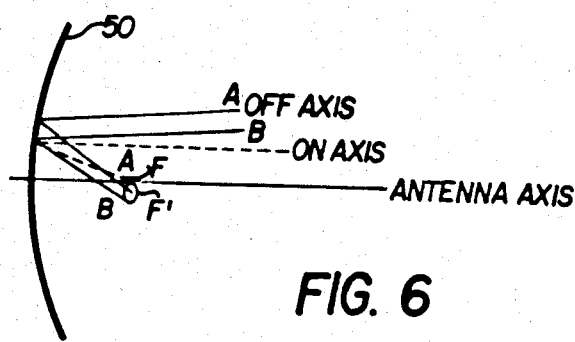
FIG. 6 is a side view illustrating how impinging electromagnetic energy is reflected from prior art reflectors.
Figure 7:
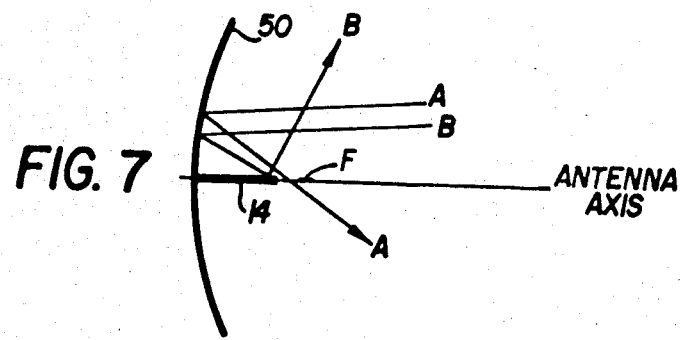
FIG. 7 is a side view of a reflector constructed according to the present invention showing how directionality, target discrimination, off-axis signal rejection and side lobe suppression, among other specifications, are improved.

FIGS. 6 and 7 illustrate why the addition of flat plates 4 improves off-axis noise rejection, directionality and side lobe suppression. FIG. 6 shows a typical prior art dish antenna reflecting surface 50. Signals received along the antenna axis are reflected to the focal point F. Off-axis signals, such as those along lines A or B, however, are reflected to regions near the focal point F, such as shown by the enclosed region F' thus contributing to increased noise. As shown in FIG. 7, which illustrates a reflecting surface having a plate 14 according to the invention, some of the off-axis noise is reflected away by flat plate 14 as shown by the reflection of the signals along line B. Thus, the reflector according to the invention provides noise reduction, increased target discrimination and directionality, since there is less interference with unwanted signals. Due to its ability to reject off-axis signals the reflector has a narrower net field of view, i.e, if the reflector axis is aimed at a first satellite, it will not "see" another R.F noise source such as a second satellite unless the second satellite is within an angle of approximately 1° on either side of the reflector axis. The present invention will, therefore, be extremely useful should the orbital spacing between geostationary orbiting satellites, now at 4°, be reduced. For example, should the Federal Communications Commission reduce satellite spacing to 2°, requiring field of views of less than 1860 miles at altitudes of 22,300 N miles, present 3 meter antennas would have their field of views filled by two or more satellites. An ideal antenna, operating at a frequency of 3.7 GHz and used in conjunction with a commercially available scalar feed horn should have a field of view of less than 1860 miles at satellite altitudes of 22,300 N miles. The base angle beam width of the antenna according to the present invention having a focal length to diameter ratio (F/D) of 0.33 is 4.19° and the half power beam width is 1.65° which gives a field of view of approximately 1,625 miles, well within the 1,860 mile limit. This compares to present antennas operating at the same frequency and having the same F/D ratio which have field of views of approximately 2,500 miles.

Prior art antennas may be designed with reduced field of views by increasing the dish depth at a fixed diameter (reducing the F/D ratio), but at a sacrifice of gain of as much as 2 dB. Thus, the present invention provides an antenna which reduces field of view without at the same time reducing gain or increasing the size of the antenna.

A corollary to the noise reduction exhibited by the antenna is that side lobe suppression is improved. Side lobe energy is all energy which is not contained within the peak beam lobe (on-axis lobe) of the antenna. The magnitude or amplitude of this off-axis side lobe energy is dependent on two sources: (1) the inherent side lobes within a parabolic optical system: and (2) the possibility of a radiating interference source within the field of view of the off-axis lobe inherent to antennas. As shown in FIG. 7, the wall section efficiently captures some small portion (not much is required) of the off axis source and shields it away from the feedhorn. Therefore, the feedhorn located at the focus never receives that missing energy, thereby significantly reducing the detected amplitude of the off-axis source.

The construction of the reflector also leads to improved gain figures over conventional reflectors. Experimental results have shown that a 0.33 F/D antenna constructed according to the invention has gains of approximately 40.6 to 41.1 dB, better than 1 dB higher than similarly sized conventional antennas. This improved gain is due in part to the fact that the flat plates of the reflector cause the distribution of energy in the main lobe to roll off faster than occurs in conventional reflectors. The main lobe width of the antenna according to the present invention is reduced 0.4° to 0.7° over conventional antennas. Beam width being inversely proportional to relative gain, the result is that the antenna according to the present invention therefore exhibits increased gain.

The dielectric barrier referred to earlier also appears to significantly improve the antenna's ability to reflect a cross polarized signal from a common source. Generally there are two signal modes being simultaneously transmitted from a satellite:
 1. vertically polarized (90° to earth horizon) and,
 2. horizontally polarized, (0° to earth horizon).
The antenna can be set to receive either one or the other. When an antenna is set to receive one polarity the second polarity should be rejected by a minimum of 20 db below that which is being received. This is known in the art as cross pole isolation.

The antenna according to the present invention has demonstrated a cross pole isolation of 5 db better than conventional antennas which it is believed is caused by the dielectric barrier between each wall member.

Figure 4:
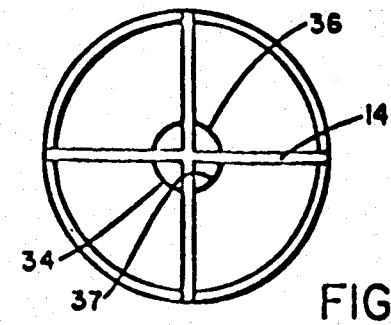
FIG. 4 is a plan view of another embodiment of the present invention.

As shown in FIG. 4, in certain outdoor applications it may be desirable to form the segments 12 by locating pressure release apertures 36 at the center of the reflector 10. This is conveniently accomplished by forming an arched wall portion 34 at the apex 37 of each segment 12, conveniently formed integrally during the formation of the segment 12, resulting in the creation of the apertures 36 when the segments 12 are brought together. Thus, when the reflector 10 is utilized in an upright configuration, wind loading may be relieved through the apertures 36, the plates 14 serving to direct the wind into and through the apertures 36.

An additional advantage of the plates 14 relates to temperature stabilization. Heat built up during the day due to exposure to sunlight is effectively dissipated on the conductive reflecting surfaces of the plates.

Figure 5:
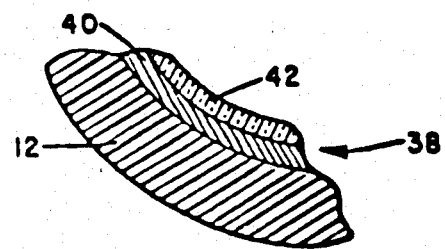
FIG. 5 is an enlarged partial cross-sectional view taken generally along the line 5—5 in FIG. 1.

A reflective coating 38 may be formed on the plastic substrate composed of the segments 12 and plates 14 using conventional metal coating techniques. Preferably, a metallic foil 40, such as aluminum foil, is laminated to a stretchable, optically smooth and flat plastic film 42, as shown in FIG. 5, having good tensile strength and a suitable modulus of elasticity. The film 42 may be stabilized from exposure to ultraviolet light, in a conventional fashion. The combined film 42 and foil 40 are then laminated to the finished segment 12 using conventional techniques such as vacuum lamination. The film and foil may be laminated together and the composite laminate secured to the segments 12 using vacuum techniques, pressure sensitive adhesive, coadhesive, heat activated catalysts or other known techniques. Using these techniques, a metal thickness of 0.0003 inch may be achieved which is sufficient not only for optical applications but also for use in reflecting other electromagnetic energy including microwave frequencies. Preferably, the film 42 is located on the outside of the segment 12 to provide transparent protection for the underlying metallic layer 40. The deposition of the metal foil 40 onto each segment 12 is facilitated by forming the segments 12 of flexible material. Concave segments 12 may then be deformed inside out in order to facilitate foil application, after which they are returned to their normal configuration.

One technique for applying metallic foil to the segments 12 comprises the following steps:

An antenna segment and a sheet of precision RF film material are placed in a steel chamber from which the air is evacuated. At 30" of Mercury, an outside port is opened and the incoming air first distorts the RF film sheet (it cannot withstand the developing pressure of the established vacuum differential). The distortion of the RF film is controlled until its shape approximates that of the segment, at which time the film is permitted to contact the segment, and lamination of the RF film to the segment is completed when full atmospheric pressure is applied to the RF film.

Thermoforming techniques in particular for producing segments 12 offer several advantages over more conventional reflector manufacturing methods. The use of a common mold insures that all components, including segments 12, are geometrically identical within 0.020" from lot to lot and from time to time. This allows predictable and repeatable antenna system performance and a practical replacement parts program.

Thermoforming plastics techniques additionally allow increased production and manufacturing rates unmatched by other more expensive technologies, such as spun aluminum or fiberglass. The convenient segmented design has significant advantages from the standpoint of shipping and assembly, because the individual segments can be nested in a small space and easily assembled on location.

The thermoforming process additionally allows precise surface irregularity control, resulting in surfaces of 0.005" RMS and improved gain figures over conventional antennas.

It should be understood that numerous modifications of the invention described herein can be devised by those skilled in the art that fall within the spirit and scope of the principles of this invention, even if the invention is not practiced as specifically described herein.

What is claimed and desired to be secured by Letters Patent of the United States is:

1. An antenna including a segmented reflector for receiving radio frequency electromagnetic energy within a defined field of view and for substantially rejecting energy outside the field of view comprising:
   at least two curved reflective segments joined together so that said segments have a common focal point, said segments defining a concave surface;
   at least one radio frequency reflecting or attenuating connecting plate arranged between and connected to each of said segments, said plate directed toward said common focal point, said plate being disposed on said concave surface of said segments; and
   means for receiving radio frequency energy reflected from said surface and not reflected or attenuated by said connecting plate, said receiving means disposed substantially only at said common focal point.

2. The antenna of claim 1 wherein four segments are joined together, each segment forming a quarter section of the reflector, said plates forming a pair of perpendicular walls intersecting along the focal line of said reflector.

3. The antenna of claim 1 wherein said segments are thermoformed plastic.

4. The antenna of claim 3 wherein said segments are vacuum thermoformed.

5. The antenna of claim 1 wherein said plates are formed integrally with said segments.

6. The antenna of claim 1 having a concave reflective surface.

7. The antenna of claim 1 wherein said segments are formed of metal coated plastic.

8. The antenna of claim 7 wherein said metal is vacuum deposited on said plastic to form a reflective surface thereon.

9. The antenna of claim 7 wherein a metal foil is deposited on said segment.

10. The antenna of claim 9 wherein a plastic film carrier is deposited on said metal foil, with said plastic film carrier facing outwardly of the segment.

11. The antenna of claim 10 wherein said carrier film is ultraviolet stabilized.

12. The antenna of claim 9 wherein a metal foil is bonded to said segment by a preapplied layer of pressure sensitive adhesive.

13. The antenna of claim 1 wherein said plate extends from the reflective surface of said segments a distance of less than about 70% of the focal length of said reflector.

14. The antenna of claim 13 wherein said plate extends beyond both sides of said segment.

15. The antenna of claim 1 including a central opening for reducing wind loading.

16. The antenna of claim 1 wherein said segments are formed of flexible sheet material.

17. The antenna of claim 1 wherein said plate is made of electrically insulative material, said plates electrically isolating said segments from one another.

18. The antenna of claim 17 wherein a portion of said plate extends over said reflective segments said portion of said plate including a reflective surface.

19. The antenna of claim 1 wherein electromagnetic energy received by said reflector substantially parallel to a line between said connecting plate and said focal point is reflected to said focal point by said reflective segments and at least some electromagnetic energy which is received substantially non-parallel with said line is reflected by said connecting plate away from said focal point or attenuated by said connecting plate.

20. A segmented reflector comprising:
   at least two curved, flexible segments;
   at least one electrically insulating connecting plate arranged between and connected to each of said segments;
   a reflective surface, including a layer of metal foil laminated to one side of each of said segments, said segments connected to have a common focus, said connecting plate having an edge directed toward said common focal point and extending from said reflective surface a distance of less than about 70% of the focal length of said reflector.

21. The reflector of claim 20 wherein said reflective surface includes a transparent plastic film laminated on the outside of said reflective surface.

22. The reflector of claim 21 wherein said segments form a concave dish shape.

23. The reflector of claim 20 wherein the portion of said plate extending over said reflective surface is itself reflective.

24. The antenna of claim 22 wherein electromagnetic energy received by said reflector substantially parallel to a line between said connecting plate and said focal point is reflected to said focal point by said reflective segments and at least some electromagnetic energy which is received substantially non-parallel with said line is reflected by said connecting plate away from said focal point or attenuated by said connecting plate.

25. An antenna including a reflector for receiving radio frequency electromagnetic energy within a defined field of view and for substantially rejecting energy outside the field of view comprising:

a concave energy reflective surface, defining a focus, focal length and a focal line;

a pair of generally perpendicular, flat plates extending outwardly of said concave surface and intersecting one another generally on the focal line of said surface, each of said plates having a pair of opposed reflective side surfaces for reflecting radio frequency energy and a pair of opposed edges, one of said edges adjacent said concave reflective surface and the other of said edges directed generally toward said focus; and means for receiving radio frequency energy reflected from said surface and not reflected or attenuated by said connecting plate, said receiving means disposed substantially only at said focus.

26. The antenna of claim 25 wherein said plates extend above the reflective surface a distance of less than 70% of the focal length.

27. The antenna of claim 25 wherein said reflective surface is made up of a plurality of electrically isolated reflective portions attached to said plates.

28. The antenna of claim 25 wherein said reflective surface is dish-shaped.

29. The reflector of claim 28 wherein said plate extends beyond both sides of said segment.

30. The antenna of claim 25 wherein electromagnetic energy received by said reflector substantially parallel to a line between said connecting plate and said focal point is reflected to said focal point by said reflective segments and at least some electromagnetic energy which is received substantially non-parallel with said line is reflected by said connecting plate away from said focal point.

31. A segmented reflector for electromagnetic energy comprising:

at least two curved reflective segments joined together so that said segments have a common focal point; and at least one connecting plate arranged between and connected to each of said segments, said plate directed towards said common focal point and extending from the reflective surface of said segments a distance of less than about 70% of the focal length of said reflector.

32. The reflector of claim 31 wherein four segments are joined together, each segment forming a quarter section of the reflector, said plates forming a pair of perpendicular walls intersecting along the focal line of said reflector.

33. The reflector of claim 31 wherein said segments are thermoformed plastic.

34. The reflector of claim 33 wherein said segments are vacuum thermoformed.

35. The reflector of claim 31 wherein said plates are formed integrally with said segments.

36. The reflector of claim 31 having a concave reflective surface.

37. The reflector of claim 31 wherein said segments are formed of metal coated plastic.

38. The reflector of claim 37 wherein said metal is vacuum deposited on said plastic to form a reflective surface thereon.

39. The reflector of claim 37 wherein a metal foil is deposited on said segment.

40. The reflector of claim 39 wherein a plastic film carrier is deposited on said metal foil, with said plastic film carrier facing outwardly of the segment.

41. The reflector of claim 40 wherein said carrier film is ultraviolet stabilized.

42. The reflector of claim 39 wherein a metal foil is bonded to said segment by a preapplied layer of pressure sensitive adhesive.

43. The reflector of claim 31 including a central opening for reducing wind loading.

44. The reflector of claim 31 wherein said segments are formed of flexible sheet material.

45. The reflector of claim 31 wherein said plate is made of electrically insulative material, said plates electrically isolating said segments from one another.

46. The reflector of claim 45 wherein a portion of said plate extends over said reflective segments, said portion of said plate including a reflective surface.

47. The reflector of claim 31 wherein electromagnetic energy received by said reflector substantially parallel to a line between said connecting plate and said focal point is reflected to said focal point by said reflective segments and at least some electromagnetic energy which is received substantially non-parallel with said line is reflected by said connecting plate away from said focal point or attenuated by said connecting plate.

48. An energy reflector comprising:

a curved energy reflective surface, defining a focus, focal length and a focal line; and a pair of generally perpendicular, flat plates extending outwardly of said surface and intersecting one another generally on the focal line of said surface, each of said plates having a pair of opposed reflective side surfaces and a pair of opposed edges, one of said edges adjacent said reflective surface and the other of said edges directed generally towards said focus, said flat plates extending above the reflective surface a distance of less than 70% of the focal length.

49. The reflector of claim 54 wherein said reflective surface is made up of a plurality of electrically isolated reflective portions attached to said plates.

50. The reflector of claim 48 wherein said reflective surface is concave dish-shaped.

51. The reflector of claim 48 wherein electromagnetic energy received by said reflector substantially parallel to a line between said connecting plate and said focal point is reflected to said focal point by said reflective segments and at least some electromagnetic energy which is received substantially non-parallel with said line is reflected by said connecting plate away from said focal point or attenuated by said connecting plate.

52. An antenna including a reflector for receiving a radio frequency electromagnetic energy within a defined field of view and for substantially rejecting energy outside the field of view comprising:

a concave energy reflective surface defining a focus and a focal line;

a generally flat plate extending outwardly of said concave surface passing through the focal line of said surface, said plate having a pair of opposed radio frequency reflecting or attenuating side surfaces and a pair of opposed edges, one of said edges adjacent said concave reflective surface and the other of said edges directed generally towards said focus; and means for receiving said radio frequency energy reflected from said surface and not reflected or attenuated by said connecting plate, said receiving means disposed substantially only at said focus.

53. The antenna of claim 52 wherein said concave energy reflective surface comprises at least two curved reflective segments joined together so that said segments have said focus as a common focal point, and wherein said plate is arranged between and connected to each of said segments, said plate directed towards said common focal point.

54. The antenna of claim 53 wherein energy received by said reflector substantially parallel to a line between said connecting plate and said focal point is reflected to said focal point by said reflective segments and at least some electromagnetic energy which is received substantially non-parallel with said line is reflected by said connecting plate away from said focal point or attenuated by said connecting plate.

* * * * *